US006417902B1

(12) United States Patent
Greenfield et al.

(10) Patent No.: US 6,417,902 B1
(45) Date of Patent: *Jul. 9, 2002

(54) PROCESS OF PREPARING A MULTILAYER CHOLESTERIC FILM I

(75) Inventors: Simon Greenfield; Alison Linda May, both of Dorset (GB)

(73) Assignee: Merck Patent Gesellschaft, Darmstadt (DE)

( * ) Notice: Subject to any disclaimer, the term of this patent is extended or adjusted under 35 U.S.C. 154(b) by 24 days.

This patent is subject to a terminal disclaimer.

(21) Appl. No.: 09/609,395

(22) Filed: Jul. 3, 2000

(30) Foreign Application Priority Data

Jul. 2, 1999 (EP) .............................. 99112830

(51) Int. Cl.⁷ ................................ G02F 1/13
(52) U.S. Cl. ................... 349/115; 349/185; 349/175
(58) Field of Search .................. 349/185, 115, 349/175, 133; 252/299.3, 299.4, 299.5, 299.7

(56) References Cited

U.S. PATENT DOCUMENTS

| 3,865,772 A | * | 2/1975 | Hulyalkar | .................... 260/29 |
| 4,073,571 A | * | 2/1978 | Gringber et al. | ............ 350/337 |
| 5,332,522 A | * | 7/1994 | Chen et al. | ............ 252/299.01 |
| 5,780,629 A | * | 7/1998 | Etzbach et al. | .............. 544/296 |
| 6,020,435 A | * | 2/2000 | Blankenship et al. | ........ 525/256 |
| 6,060,042 A | * | 5/2000 | Shuhmacher et al. | .......... 424/60 |
| 6,061,108 A | * | 5/2000 | Anderson et al. | .............. 349/98 |
| 6,071,438 A | * | 6/2000 | Leigeber et al. | ............ 252/585 |
| 6,159,406 A | * | 12/2000 | Shelby et al. | .......... 264/211.12 |
| 6,217,955 B1 | * | 4/2001 | Coates et al. | ............... 428/1.31 |

* cited by examiner

Primary Examiner—William L. Sikes
Assistant Examiner—Hoan Nguyen
(74) Attorney, Agent, or Firm—Millen, White, Zelano & Branigan, P.C.

(57) ABSTRACT

The invention relates to a process of preparing a multilayer cholesteric film comprising two or more layers of polymerized cholesteric liquid crystal (CLC) material with planar orientation, with the cholesteric helix axis oriented substantially perpendicular to the plane of the layer, wherein during preparation of the single layers the migration of unpolymerized material between adjacent layers is minimized, to a multilayer cholesteric film obtainable by such a process, and to the use of the process and a multilayer cholesteric film thereby prepared in optical elements such as polarizers, compensators, alignment layers, color filters or holographic elements, in cosmetics and liquid crystal pigments, for decorative and security applications.

17 Claims, 2 Drawing Sheets

PROCESS OF PREPARING A MULTILAYER CHOLESTERIC FILM I

The invention relates to a process of preparing a multilayer cholesteric film. The invention further relates to a multilayer film obtainable by the inventive process, and to the use of the inventive process and a film prepared thereby in optical elements such as polarizers, compensators, alignment layers, color filters or holographic elements, in cosmetics and liquid crystal pigments, for decorative and security applications.

BACKGROUND OF THE INVENTION

Cholesteric liquid crystal (CLC) materials, when formed into thin layers with planar alignment, i.e. wherein the cholesteric helix axis is oriented substantially perpendicular to the plane of the layer, exhibit the well-known effect of selective reflection of light, where the wavelength of the reflected light is dependent on the pitch of the cholesteric helix. By using polymerizable CLC materials, the aligned CLC layer can be converted to a coherent polymer film that retains the selective reflection properties of the original material.

CLC polymer films are known in prior art and have been proposed for a variety of uses, for example as broadband or notch polarizers, as color filters in displays or projection systems, and for decorative and security purposes, like the preparation of colored image films or cholesteric pigment flakes.

For some applications, it is desirable to form a multilayer cholesteric film, comprising two or more cholesteric layers e.g. exhibiting different reflection wavelength.

Multilayer cholesteric polymer films have been described in prior art. For example, EP 0 634 674 suggests to prepare a multilayer cholesteric liquid crystal polymer film by bringing together a pair of chiral nematic liquid crystal polymer films, applying pressure and heating the polymers above their glass transition temperature to allow the films to adhere.

Maurer et al., SID 90 Digest, Vol. 21, pp. 110 (1990) describes a polarizing color filter obtained by combining several polarizing films with different reflection wavelength. For the preparation of each film, a layer of a CLC side chain polysiloxane comprising chiral and achiral sidegroups is brought between two glass plates and oriented by shearing at high temperatures.

JP 01-133003-A (Sumitomo Chem. Ind.) and JP 08-271731-A (Nitto Denko) disclose polarizing plates that are obtained by lamination of one or more CLC polymer layers onto a quarter wave plate.

However, the methods of preparing multilayer cholesteric films as described in the above documents bear several disadvantages. Thus, it is often very difficult and requires high temperatures to achieve uniform alignment in the CLC polymer layer. For example, Maurer et al. mentions an aligning temperature of 150° C., whereas JP 01-133003-A and JP 08-271731-A mention that temperatures well above the glass temperature of the CLC polymers are required. This is especially disadvantageous when polymers with high glass temperatures, like acrylates, styrenes or methacrylates are used, and is highly unsuitable in particular for mass production.

Furthermore, according to the method of multilayer preparation as described e.g. in JP 01-133003-A, the polymers have to be selected such that the different polymer layers exhibit different glass temperatures. Thus, when laminating and aligning, e.g. a second layer on top of a first layer, the aligning temperature (and thus the glass temperature) of the second layer has to be lower than the glass temperature of the first layer, so as not to affect the uniform orientation of the first layer, etc. This severly limits the choice of suitable materials and makes the production process more complicated.

Therefore, there is a need for a method to prepare a multilayer cholesteric film in an efficient and cost-effective manner that does not have the above mentioned drawbacks, allows better control of the reflection wavelength and is suitable for mass production.

SUMMARY OF THE INVENTION

One aim of the present invention is to provide a process of preparing a multilayer cholesteric film that fulfills the above requirements. Other aims of the invention are immediately evident to a person skilled in the art from the following description.

A simple way to prepare a multilayer cholesteric film is by first coating and polymerizing a cholesteric layer of one wavelength, and then onto this directly coating and polymerizing a second cholesteric layer, e.g. of a different wavelength.

In this case it is important to ensure that there is no interaction between the layers and that the reflection wavelength of either layers does not change in an uncontrollable manner. The inventors of the present invention have found that this can be achieved if the migration of unpolymerized material between adjacent layers, in particular the migration of unpolymerized chiral material from the first, polymerized layer to the second, still unpolymerized layer, is minimized.

One way of removing unpolymerized material from a polymerized layer would be to swell or soak it with a suitable solvent, in order to 'wash out' unpolymerized components, before coating the next layer on top of it.

However, this procedure is time- and material-consuming, and is in particular unsuitable for large scale production of a multilayer cholesteric film, where the single cholesteric layers should preferably be coated directly on top of each other.

The inventors now found that, when preparing a multilayer cholesteric film, it is possible to minimize migration of unpolymerized chiral material, and thus to reduce an undesired change of the reflection wavelength in the single cholesteric layers prior to their polymerization. A process for achieving this, which is another aspect of the invention, is described in detail below.

One object of the present invention is a process of preparing a multilayer cholesteric film comprising two or more layers of polymerized cholesteric liquid crystal (CLC) material with planar orientation, wherein the first layer is prepared by applying a layer of polymerizable CLC material on a substrate, preferably by coating, optionally aligning the CLC material in a planar orientation, and polymerizing the aligned CLC material, for example by means of heat or actinic radiation, and the second and higher layers are prepared by applying a layer of polymerizable CLC material on a substrate, preferably by coating, optionally aligning the CLC material in a planar orientation, and polymerizing the aligned CLC material, for example by means of heat or actinic radiation, wherein one of the previously polymerized layers serves as substrate, characterized in that the migration of unpolymerized material between adjacent layers is minimized.

Another object of the present invention is a multilayer cholesteric film obtainable by a process as described above and below.

Another object of the present invention relates to the use of a process as described above and below, and of a multilayer cholesteric film obtainable by this process, in optical elements such as polarizers, compensators, alignment layers, color filters or holographic elements, in cosmetics and liquid crystal pigments, for decorative and security applications.

FIG. 1 depicts the visible light absorption spectrum of two-layer cholesteric films prepared from two polymerizable CLC mixtures with different reflection wavelength in varying order, compared to the spectrum of the one-layer films prepared from the CLC mixtures.

FIG. 2 depicts the visible light absorption spectrum of two-layer cholesteric films prepared from two polymerizable CLC mixtures with different reflection wavelength, wherein the second layer was aneealed for various time periods before being polymerized, compared to the spectrum of the one-layer films prepared from the CLC mixtures.

The term 'layer of cholesteric liquid crystal material with planar orientation' means a liquid crystal material with a cholesteric phase, i.e. wherein the mesogens are oriented with their main molecular axis in a preferred direction within molecular sublayers, said preferred orientation direction in different sublayers being twisted around a helix axis that is substantially perpendicular to the plane of the layer, i.e. substantially parallel to the layer normal. This definition also includes orientations where the helix axis is tilted at an angle of up to 2° relative to the layer normal.

Especially preferred are multilayer cholesteric films wherein adjacent layers have different helical pitch.

Further preferred are multilayer cholesteric films wherein the polymerized CLC material forms a three-dimensional polmyer network.

The polymerizable CLC material according to the present invention is a mixture comprising one or more polymerizable achiral mesogenic compounds, and further comprising one or more polymerizable chiral mesogenic compounds and/or one or more non-polymerizable chiral dopants that induce the cholesteric liquid crystalline phase behavior in the mixture.

A first preferred embodiment of the present invention relates to a process as described herein, wherein the amount of components of the polymerizable CLC material of the first layer that do not become chemically bound to the polymerized material is minimized.

This is achieved by minimizing the amount of those components of the CLC material that do not carry a polymerizable group, such as e.g. photoinitiators, chiral dopants or surfactants, and/or by maximizing the extent of polymerization of the first layer.

Very preferred is a mixture of polymerizable CLC material wherein the total amount of components not carrying a polymerizable group is less than 5%, in particular less than 3%, very preferably less than 1% by weight of the total mixture.

It is in particular the chiral unpolymerized compounds migrating between the layers that alter the helical pitch (and therefore the reflection wavelength) of the unpolymerized layer. The change of the reflection wavelength increases both with increasing amount and increasing helical twisting power (HTP) of the chiral material.

The helical twisting power (HTP) of a chiral dopant inducing a cholesteric phase in a nematic liquid crystal host mixture is defined by equation (1):

$$p = \frac{1}{HTP} \cdot \frac{1}{c} \qquad (1)$$

wherein p is the pitch of the cholesteric helix and c is the concentration of the chiral dopant.

The reflection wavelength λ of a CLC material comprising the nematic host and chiral dopant of above equation (1) is given in first approximation by equation (2):

$$\lambda = n \cdot p \qquad (2)$$

wherein p is the pitch and n the mean refractive index of the cholesteric material.

Combining equations (1) and (2) leads to:

$$\lambda = n \cdot HTP^{-1} \cdot c^{-1} \qquad (3)$$

The migration of unpolymerized material between two adjacent layers of CLC material changes the concentration c of the chiral material in the layer and thus leads to a change of the reflection wavelength as long as the CLC material is not polymerized.

However, in case of a polymerized CLC layer, for example, a loss of unpolymerized chiral material will not lead to a significant change of the reflection wavelength, since the twisted cholesteric structure of the layer is fixed by polymerization as described above.

According to this invention, the relative change of the reflection wavelength in a second layer of polymerizable CLC material coated onto a first layer of polymerized CLC material due to migration of unpolymerized material into or out of the second layer is defined as $|\lambda - \lambda_0|/\lambda_0$, wherein $\lambda_0$ is the wavelength of the centre of the reflection peak of the CLC material of said second layer when polymerized as a single layer on a substrate, and λ is the wavelength of the centre of the reflection peak of the CLC material of said second layer when polymerized on said first layer.

The substrate used for preparing the second layer as a single layer to determine λ was shown to have no significant influence on the reflection wavelength of the polymerized CLC material. As standard substrate a glass substrate (sodalime without ITO from Microtech Corp., Japan) coated with polyimide (AL-1054 from JSR Ltd. Co, Japan, applied by spin-coating and rubbed unidirectionally) was used.

The first and second layer can be made of identical or different polymerizable CLC materials.

Preferably, in a process according to the present invention migration of chiral material between two adjacent layers is minimized such that $|\lambda - \lambda_0|/\lambda_0 \leq 0.2$, in particular $\leq 0.1$, very preferably $\leq 0.05$, most preferably $\leq 0.02$.

In case of a polymerizable CLC material comprising both chiral polymerizable mesogenic compounds with a low or moderate HTP and non-polymerizable chiral dopants with a high HTP, it is possible that both unreacted chiral polymerizable mesogenic compounds and non-polymerizable dopant migrate from the first, polymerized layer into the second, unpolymerized layer. In this case, however, the effect of the unpolymerized dopant on the wavelength of the second layer is significantly stronger compared to the effect of the unreacted polymerizable material, whereas the latter effect is much smaller.

Thus, the effect of non-polymerizable chiral dopants migrating from the first into the second layer and changing the reflection wavelength of the second layer can be controlled by selection of the amount and type of the chiral dopant, the latter being chosen e.g. according to its HTP or migration rate. A minimization of this effect can thus be achieved by reducing the amount of non-polymerizable chiral dopants and/or by reducing the HTP or migration rate of the dopants.

On the other hand, in case of high HTP dopants even the migration of small amounts into the unpolymerized cholesteric layer can lead to a considerable change of its reflection wavelength. Therefore, according to the inventive method both the amount and the HTP of the dopant have to be balanced.

In a particularly preferred embodiment, the polymerizable CLC material of the first and higher layers comprises less than 15%, preferably less than 10%, very preferably less than 5% by weight of non-polymerizable chiral dopants. Very preferably the polymerizable CLC material contains no non-polymerizable chiral dopants.

Particularly preferred are dopants with a HTP>20 $\mu m^{-1}$, very preferably with a HTP>50 $\mu m^{-1}$.

Another particularly preferred embodiment of the present invention relates to a process according to claim 1, wherein the extent of polymerization of the first layer is maximized.

The more completely the first layer is polymerized, the lower will be the amount of material which is polymerizable, but unreacted after polymerization, and which can migrate into the second layer. At the same time, this makes the first, polymerized layer more impenetrable to the material, e.g. the solvent, from the second, still unpolmyerized layer, as the first polymerized layer is more coherent.

The extent of polymerization is preferably $\geq 60\%$, in particular $\geq 80\%$, most preferably $\geq 95\%$.

It is also important that the first layer has a degree of crosslinking that is high enough so that its helical pitch does not change, or change only minimally, as the chiral dopant migrates out of the layer. At the same time, however, the degree of crosslinking should not be too high, in order not to enhance migration of chiral dopants out of the layer, e.g. due to macroscopic phase separation.

The minimum degree of crosslinking is typically 5–10%. Preferably the degree of crosslinking is 10–40%, most preferably 40–60%.

A second preferred embodiment of the present invention relates to a process according to claim 1, wherein the polymerizable CLC material of at least one of the second and higher layers is used in combination with a solvent which is selected to have a small penetrating effect on the previously polymerized layer.

Thus, the CLC material is dissolved or dispersed in a solvent for the coating process. Penetration of the solvent into the first, polymerized layer greatly enhances the migration of material from the first layer into the second layer. This can lead to a change in the helical pitch of the second layer. On the other hand, if the polymerized material in the first layer becomes swollen by the solvent, or by low molecular weight components from the second layer, the resulting expansion of the layer causes the pitch length to increase with a shift in the reflection band to longer wavelengths.

The migration of material into the second layer can therefore be minimized if the solvent is selected such that it has a small penetrating effect on the first, polymerized layer. The penetrating effect of the solvent can be determined by measuring the degree of swelling of the polymerized material of the first layer in the solvent. Preferably a solvent is used wherein the polymerized CLC material of the previously polymerized layer has a small degree of swelling.

Another way to determine the penetrating effect of a solvent is to measure the change of reflection wavelength of an inventive polymerized layer of CLC material before and after treatment with the solvent. This is exemplarily illustrated in example 3.

A solvent with high penetrating power is effective at removing non-polymerized material from the polymer film which then shrinks and its reflection wavelength becomes shorter. On the other hand, a solvent with a small penetrating effect will lead to a small change of reflection wavelength after solvent treatment.

Particularly preferred are solvents with a small penetrating effect, causing a change of reflection wavelength $|\Delta\lambda/\lambda| \leq 0.2$, in particular $\leq 0.1$, very preferably $\leq 0.05$, wherein $\Delta\lambda = (\lambda_{before} - \lambda_{after})$ is the difference of the central reflection wavelength of a polymerized CLC layer before ($\lambda_{before}$) and after ($\lambda_{after}$) solvent treatment, Preferred solvents are diethyl ether, isopropanol, cyclohexane and PGMEA, for example.

A third preferred embodiment of the present invention relates to a process according to claim 1, wherein the polymerizable CLC material of at least one of the second and higher layers is annealed at a temperature below the cholesteric-isotropic phase transition temperature of the CLC material prior to polymerization, wherein the annealing time and temperature are minimized.

Thus, it may be necessary for the second layer to be annealed at an elevated temperature prior to curing in order to get good alignment. In this case the annealing temperature and time should be minimized in order to reduce migration of material (particularly chiral dopant) between layers. This migration is promoted by increases in both temperature and time of the annealing process (see example 2). If the annealing time is sufficiently long, there can be a significant change in the reflection wavelength of the second layer.

The annealing temperature is preferably 1 to 40° C., in particular 10 to 40° C. below the cholesteric-isotropic phase transition temperature of the polymerizable CLC material. The annealing time is preferably less than 1 minute, in particular less than 30 seconds, very preferably not more than 10 seconds, most preferably not more than 5 seconds.

A fourth preferred embodiment relates to a process according to claim 1, wherein adjacent layers are prepared in a sequence where the pitch of the CLC material of the layer that is prepared first is longer than the pitch of the CLC material of the layer that is prepared next. Thus, preferably the CLC mixtures of adjacent layers are selected such that the initial amount of dopant in the first layer is smaller, and thus its helical pitch is longer, than in the second layer. Thereby, migration of dopants from the first into the second layer is reduced.

The exact difference in pitch between adjacent layers depends on the final application that the cholesteric film is intended to be used for. Typically the difference is in the range of 30–300 nm.

The thickness of the single layers is preferably less than 5 $\mu m$, in particular from 1 to 5 $\mu m$, very preferably from 3 to 5 $\mu m$.

In a preferred embodiment the polymerizable CLC mixture comprises at least one polymerizable mesogenic compound having two or more polymerizable functional groups (di- or multireactive or di- or multifunctional compound). Upon polymerization of such a mixture a three-dimensional polymer network is formed. A polymer film made of such a network is self-supporting and shows a high mechanical and thermal stability and a low temperature dependence of its liquid crystal properties properties. In the ideal case the liquid crystal properties of the polymer film are temperature independent.

By varying the concentration of the multifunctional mesogenic or non mesogenic compounds, the crosslink density of the resulting polymer film and thereby its physical and chemical properties such as the glass transition temperature, which is also important for the temperature dependence of the optical properties of the film, the thermal and mechanical stability or the solvent resistance can be tuned easily.

Especially preferably the polymerizable CLC mixture comprises 5 to 100%, in particular 25 to 80%, very preferably 45 to 70%, by weight of multireactive mesogenic compounds. Direactive mesogenic compounds are particularly preferred.

The polymerizable components of the CLC material according to the present invention are preferably selected from formula I

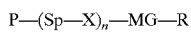

P—(Sp—X)$_n$—MG—R    I wherein

P is CH$_2$=CW—COO—, WCH=CH—O—,

or CH$_2$=CH—Phenyl-(O)$_k$— with W being H, CH$_3$ or Cl and k being 0 or 1,

Sp is a spacer group having 1 to 25 C atoms,

X is —O—, —S—, —CO—, —COO—, —OCO—, —CO—NH—, —NH—CO—, —CH$_2$CH$_2$—, —OCH$_2$—, —CH$_2$O—, —SCH$_2$—, —CH$_2$S—, —CH=CH—, —CH=CH—COO—, —OCO—CH=CH—, —C≡C—, or a single bond, n is 0 or 1, MG is a mesogenic group, and R is H, CN, halogen or a straight-chain or branched alkyl radical with up to 25 C atoms which may be unsubstituted, mono- or polysubstituted by halogen or CN, it being also possible for one or more non-adjacent CH$_2$ groups to be replaced, in each case independently from one another, by —O—, —S—, —NH—, —N(CH$_3$)—, —CO—, —COO—, —OCO—, —OCO—O—, —S—CO—, —CO—S— or —C≡C— in such a manner that oxygen atoms are not linked directly to one another, or alternatively R is denoting P—(Sp—X)$_n$—.

MG in formula I is preferably selected of formula II

—A$^1$—Z$^1$—(A$^2$—Z$^2$—)$_m$—A$^3$—    II wherein

Z$^1$ and Z$^2$ are each independently —COO—, —OCO—, —CH$_2$CH$_2$—, —OCH$_2$—, —CH$_2$O—, —CH=CH—, —CH=CH—COO—, —OCO—CH=CH—, —C≡C—, or a single bond, A$^1$, A$^2$ and A$^3$ are each independently 1,4-phenylene in which, in addition, one or more CH groups may be replaced by N, 1,4-cyclohexylene in which, in addition, one or two non-adjacent CH$_2$ groups may be replaced by O and/or S, 1,4-cyclohexenylene, 1,4-bicyclo(2,2,2)octylene, piperidine-1,4-diyl, naphthalene-2,6-diyl, decahydronaphthalene-2,6-diyl, or 1,2,3,4-tetrahydronaphthalene-2,6-diyl, it being possible for all these groups to be unsubstituted, mono- or polysubstituted with F,Cl, OH, CN or NO$_2$ or alkyl, alkoxy or alkanoyl groups having 1 to 7 C atoms wherein one or more H atoms may be substituted by F or Cl, and m is 0, 1 or 2.

A smaller group of preferred mesogenic groups of formula II is listed below. For reasons of simplicity, Phe in these groups is 1,4-phenylene, PheL is a 1,4-phenylene group which is substituted by 1 to 4 groups L, with L being F, Cl, OH, CN, NO$_2$ or an optionally fluorinated alkyl, alkoxy or alkanoyl group with 1 to 7 C atoms, and Cyc is 1,4-cyclohexylene. The following list of preferred mesogenic groups is comprising the subformulae II-1 to II-24 as well as their mirror images

| | |
|---|---|
| —Phe—Z—Phe— | II-1 |
| —Phe—Z—Cyc— | II-2 |
| —Cyc—Z—Cyc— | II-3 |
| —PheL—Z—Phe— | II-4 |
| —PheL—Z—Cyc— | II-5 |
| —PheL—Z—PheL— | II-6 |
| —Phe—Z—Phe—Z—Phe— | II-7 |
| —Phe—Z—Phe—Z—Cyc— | II-8 |
| —Phe—Z—Cyc—Z—Phe— | II-9 |
| —Cyc—Z—Phe—Z—Cyc— | II-10 |
| —Phe—Z—Cyc—Z—Cyc— | II-11 |
| —Cyc—Z—Cyc—Z—Cyc— | II-12 |
| —Phe—Z—Phe—Z—PheL— | II-13 |
| —Phe—Z—PheL—Z—Phe— | II-14 |
| —PheL—Z—Phe—Z—Phe— | II-15 |
| —PheL—Z—Phe—Z—PheL— | II-16 |
| —PheL—Z—PheL—Z—Phe— | II-17 |
| —PheL—Z—PheL—Z—PheL— | II-18 |
| —Phe—Z—PheL—Z—Cyc— | II-19 |
| —Phe—Z—Cyc—Z—PheL— | II-20 |
| —Cyc—Z—Phe—Z—phe— | II-21 |
| —PheL—Z—Cyc—Z—PheL— | II-22 |
| —PheL—Z—PheL—Z—Cyc— | II-23 |
| —PheL—Z—Cyc—Z—Cyc— | II-24 |
| —Cyc—Z—PheL—Z—Cyc— | II-25 |

Particularly preferred are the subformulae II-1, II-2, II-4, II-6, II-7, II-8, II-11, II-13, II-14, II-15 and II-16.

Z in these preferred groups has in each case independently one of the meanings of Z$^1$ as given in formula I. Preferably Z is —COO—, —OCO—, —CH$_2$CH$_2$—, —C≡C— or a single bond.

Very preferably the mesogenic group MG is selected from the following formulae and their mirror images

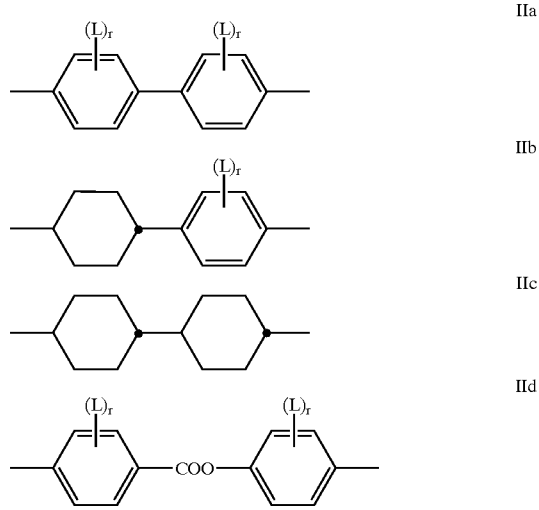

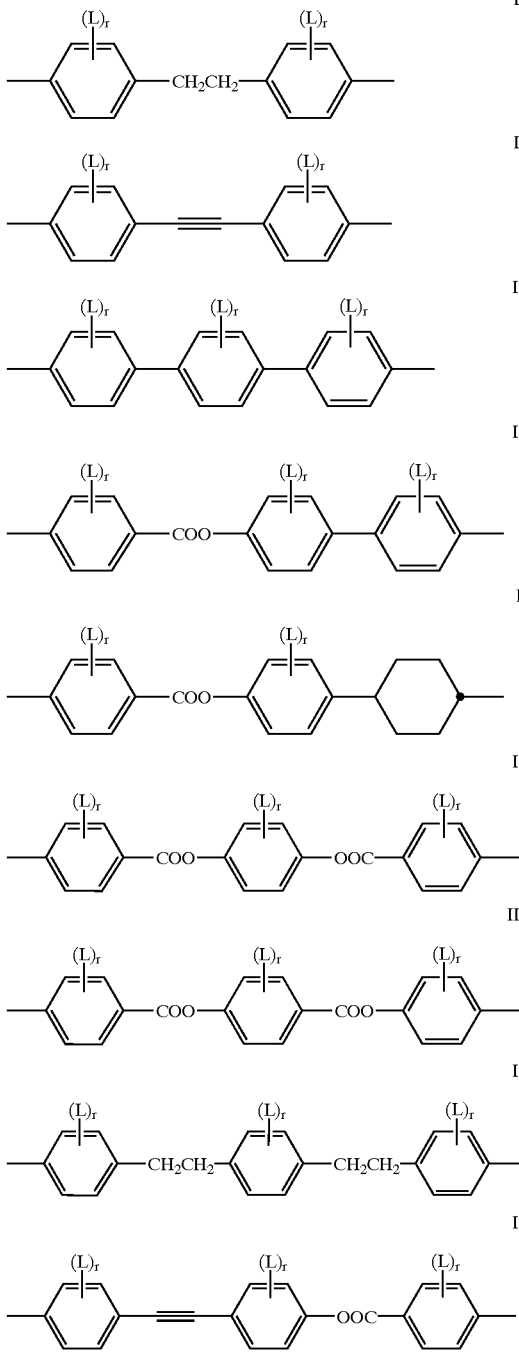

wherein L has the meaning given above and r is 0, 1 or 2.

The group

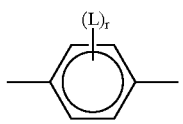

in these preferred formulae is very preferably denoting

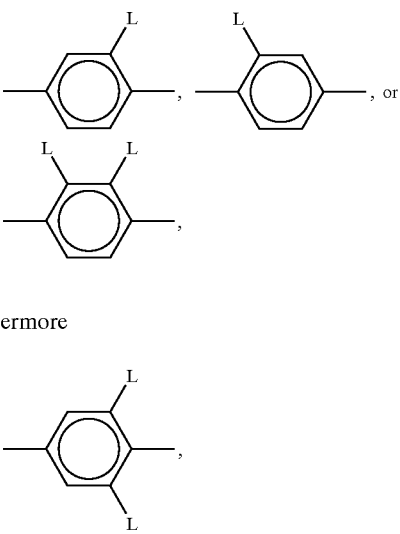

furthermore with L having each independently one of the meanings given above.

Particularly preferred are the subformulae IId, IIg, IIh, IIi, IIk and IIo, in particular the subformulae IId and IIk.

L is preferably F, Cl, CN, OH, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, in particular F, Cl, CN, $CH_3$, $C_2H_5$, $OCH_3$, $COCH_3$ and $OCF_3$, most preferably F, Cl, $CH_3$, $OCH_3$ and $COCH_3$.

In case of a polymerizable mesogenic compounds with a terminal polar group, R is preferably alkyl with up to 15 C atoms or alkoxy with 2 to 15 C atoms.

If R in formula I is an alkyl or alkoxy radical, i.e. where the terminal $CH_2$ group is replaced by —O—, this may be straight-chain or branched. It is preferably straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy, or octoxy, furthermore methyl, nonyl, decyl, undecyl, dodecyl, tridecyl, tetradecyl, pentadecyl, nonoxy, decoxy, undecoxy, dodecoxy, tridecoxy or tetradecoxy, for example.

Oxaalkyl, i.e. where one $CH_2$ group is replaced by —O—, is preferably straight-chain 2-oxapropyl (=methoxymethyl), 2-(=ethoxymethyl) or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-, 7-, 8- or 9-oxadecyl, for example.

In case of a polymerizable mesogenic compounds with a terminal polar group, R is selected from CN, $NO_2$, halogen, $OCH_3$, OCN, SCN, $COR^1$, $COOR^1$ or a mono- oligo- or polyfluorinated alkyl or alkoxy group with 1 to 4 C atoms. $R^1$ is optionally fluorinated alkyl with 1 to 4, preferably 1 to 3 C atoms. Halogen is preferably F or Cl. Especially preferably R in these compounds is selected of F, Cl, CN, $NO_2$, $OCH_3$, $COCH_3$, $COC_2H_5$, $COOCH_3$, $COOC_2H_5$, $CF_3$, $C_2F_5$, $OCF_3$, $OCHF_2$, and $OC_2F_5$, in particular of F, Cl, CN, $OCH_3$ and $OCF_3$.

In the compounds of formula I R may be an achiral or a chiral group. In case of a chiral group it is preferably selected according to the following formula III:

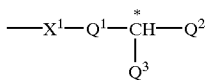

III wherein $X^1$ is —O—, —S—, —CO—, —COO—, —OCO—, —OCOO— or a single bond, $Q^1$ is an alkylene or alkylene-oxy group with 1 to 10 C atoms or a single bond, $Q^2$ is an alkyl or alkoxy group with 1 to 10 C atoms which may be unsubstituted, mono- or polysubstituted by halogen or CN, it being also possible for one or more non-adjacent $CH_2$ groups to be replaced, in each case independently from one another, by —C≡C—, —O—, —S—, —NH—, —N($CH_3$)—, —CO—, —COO—, —OCO—, —OCO—O—, —S—CO— or —CO—S— in such a manner that oxygen atoms are not linked directly to one another, $Q^3$ is halogen, a cyano group or an alkyl or alkoxy group with 1 to 4 C atoms different from $Q^2$.

In case $Q^1$ in formula III is an alkylene-oxy group, the O atom is preferably adjacent to the chiral C atom.

Preferred chiral groups R are 2-butyl (=1-methylpropyl), 2-methylbutyl, 2-methylpentyl, 3-methylpentyl, 2-ethylhexyl, 2-propylpentyl, 2-octyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-nonyl, 2-decyl, 2-dodecyl, 6-methoxyoctoxy, 6-methyloctoxy, 6-methyloctanoyloxy, 5-methylheptyloxycarbonyl, 2-methylbutyryloxy, 3-methylvaleroyloxy, 4-methylhexanoyloxy, 2-chlorpropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy for example.

In addition, compounds of formula I containing an achiral branched group R may occasionally be of importance, for example, due to a reduction in the tendency towards crystallization. Branched groups of this type generally do not contain more than one chain branch. Preferred achiral branched groups are isopropyl, isobutyl (=methylpropyl), isopentyl (=3-methylbutyl), isopropoxy, 2-methylpropoxy and 3-methylbutoxy.

Another preferred embodiment of the present invention relates to compounds of formula I wherein R is denoting P—(Sp—X)$_n$—.

P in formula I is preferably an acrylate group, a methacrylate group, a vinyl or vinyloxy group, an epoxy group, a styrene group or a propenyl ether group, in particular an acrylate, methacrylate, vinyl or epoxy group.

As for the spacer group Sp in formula I all groups can be used that are known for this purpose to the skilled in the art. The spacer group Sp is preferably a linear or branched alkylene group having 1 to 20 C atoms, in particular 1 to 12 C atoms, in which, in addition, one or more non-adjacent $CH_2$ groups may be replaced by —O—, —S—, —NH—, —N($CH_3$)—, —CO—, —O—CO—, —S—CO—, —O—COO—, —CO—S—, —CO—O—, —CH (halogen)-, —CH(CN)—, —CH=CH— or —C≡C—.

Typical spacer groups are for example —($CH_2$)$_o$—, —($CH_2CH_2O$)$_p$—$CH_2CH_2$—, —$CH_2CH_2$—S—$CH_2CH_2$— or —$CH_2CH_2$—NH—$CH_2CH_2$—, with o being an integer from 2 to 12 and p being an integer from 1 to 3.

Preferred spacer groups are ethylene, propylene, butylene, pentylene, hexylene, heptylene, octylene, nonylene, decylene, undecylene, dodecylene, octadecylene, ethyleneoxyethylene, methyleneoxybutylene, ethylene-thioethylene, ethylene-N-methyl-iminoethylene, 1-methylalkylene, ethenylene, propenylene and butenylene for example.

Especially preferred are inventive compounds of formula I wherein Sp is denoting an alkyl or alkoxy group with 2 to 8 C atoms. Straight-chain alkyl or alkoxy groups are especially preferred.

In another preferred embodiment of the invention the chiral compounds of formula I comprise at least one spacer group Sp that is a chiral group of the formula IV:

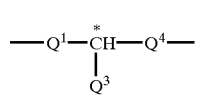

IV wherein $Q^1$ and $Q^3$ have the meanings given in formula III, and $Q^4$ is an alkylene or alkylene-oxy group with 1 to 10 C atoms or a single bond, being different from $Q^1$.

In case $Q^1$ and $Q^4$ in formula IV are an alkylene-oxy group, the O atom is preferably adjacent to the chiral C atom.

In the event that R is denoting P—Sp—X— the two spacer groups Sp in the compounds of formula I may be identical or different.

Of the preferred compounds described above particularly preferred are those wherein n is 1.

Further preferred are compounds comprising both a group P—(Sp—X)$_n$— wherein n is 0 and a group P—(SP—X)$_n$— wherein n is 1.

The compounds of formula I can be synthesized according to or in analogy to methods which are known per se and which are described in standard works of organic chemistry such as, for example, Houben-Weyl, Methoden der organischen Chemie, Thieme-Verlag, Stuttgart. Some specific methods of preparation can be taken from the examples.

Examples of suitable polymerizable mesogenic compounds that can be used as components of the polymerizable CLC material, are disclosed for example in WO 93/22397; EP 0,261,712; DE 195,04,224; WO 95/22586 and WO 97/00600. The compounds disclosed in these documents, however, are to be regarded merely as examples that shall not limit the scope of this invention.

Preferably the polymerizable CLC mixture comprises at least one polymerizable mesogenic compound having one polymerizable functional group and at least one polymerizable mesogenic compound having two or more polymerizable functional groups.

Examples of especially useful monoreactive chiral and achiral polymerizable mesogenic compounds are shown in the following list of compounds, which should, however, be taken only as illustrative and is in no way intended to restrict, but instead to explain the present invention:

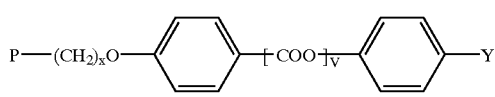 (Va)

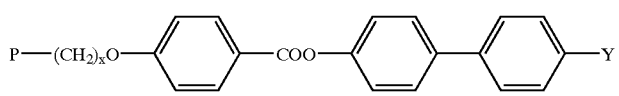 (Vb)

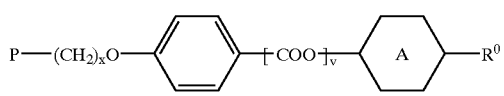 (Vc)

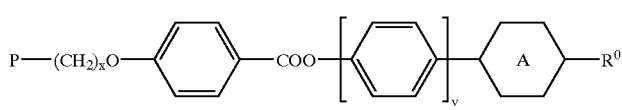 (Vd)

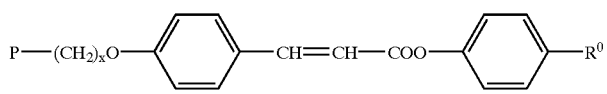 (Ve)

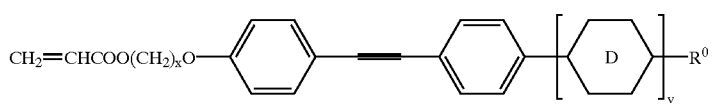 (Vf)

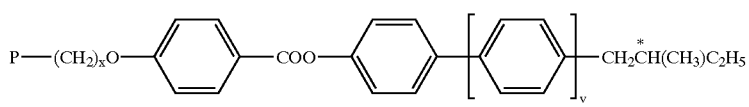 (Vg)

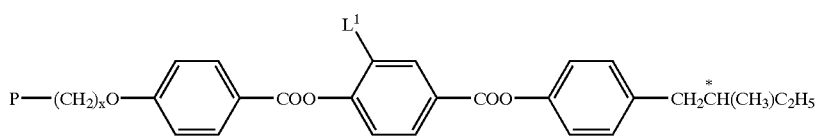 (Vh)

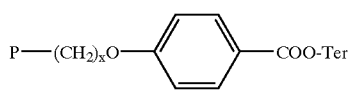 (Vi)

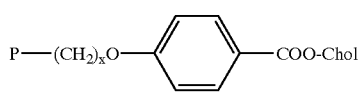 (Vk)

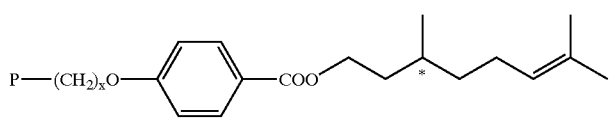 (Vm)

wherein, P has one of the meanings of formula I and its preferred meanings as mentioned above, x is an integer from 1 to 12, A is 1,4-phenylene or 1,4-cyclohexylene, v is 0 or 1, Y is a polar group as defined above, $R^0$ is an unpolar alkyl or alkoxy group, Ter is a terpenoid radical like e.g. menthyl, Chol is a cholesteryl group, and $L^1$ and $L^2$ are each independently H, F, Cl, CN, OH, $NO_2$ or an optionally halogenated alkyl, alkoxy or carbonyl group with 1 to 7 C atoms.

The term unpolar group in this connection preferably denotes an alkyl group with 1 or more, preferably 1 to 15 C atoms or an alkoxy group with 2 or more, preferably 2 to 15 C atoms.

Examples of useful direactive chiral and achiral polymerizable mesogenic compounds are shown in the following list of compounds, which should, however, be taken only as illustrative and is in no way intended to restrict, but instead to explain the present invention

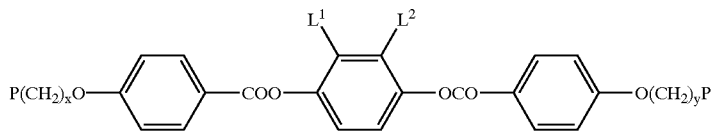
(VIa)

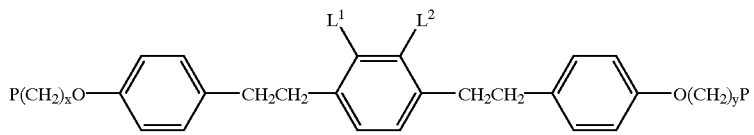
(VIb)

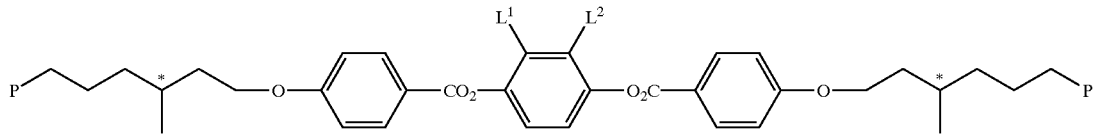
(VIc)

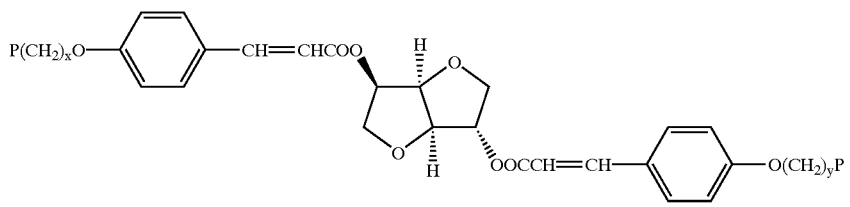
(VId)

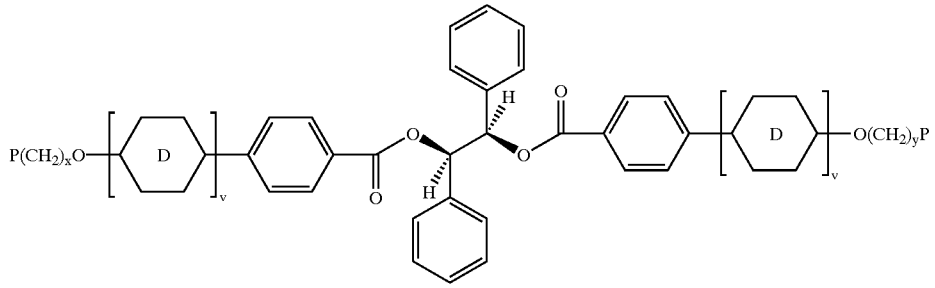
(VIe)

wherein P, x, D, $L^1$ and $L^2$ have one of the meanings given above and y is an integer from 1 to 12 the same as or different from x.

A polymerizable CLC material according to the first preferred embodiment as described above comprises one or more chiral dopants which themselves do not necessarily have to show a liquid crystalline phase and give good planar alignment themselves, in particular non-polymerizable chiral dopants.

Especially preferred are chiral dopants with a high helical twisting power (HTP), in particular those disclosed in WO 98/00428. Further typically used chiral dopants are e.g. the commercially available S 1011, R 811 or CB 15 (from Merck KGaA, Darmstadt, Germany).

Especially preferred are chiral non-polymerizable dopants selected from the following formulae

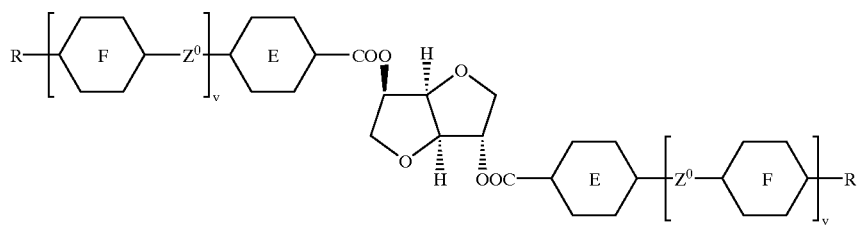
VII

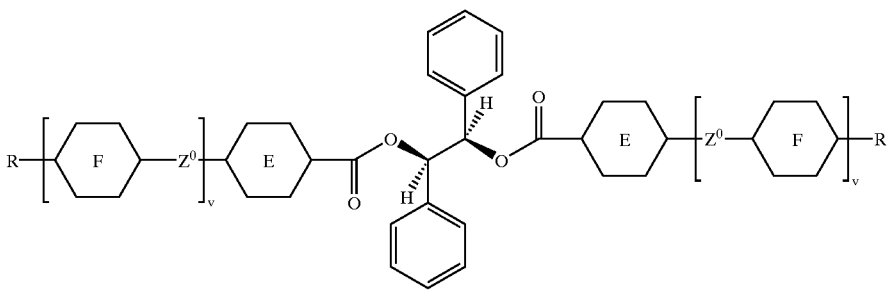

VIII with formula VIII including the (S,S) enantiomer,
wherein E and F are each independently 1,4-phenylene or trans-1,4-cyclohexylene, v is 0 or 1, $Z^0$ is —COO—, —OCO—, —CH$_2$CH$_2$— or a single bond, and R is alkyl, alkoxy or alkanoyl with 1 to 12 C atoms.

The compounds of formula VII and their synthesis are described in WO 98/00428. The compounds of formula VIII and their synthesis are described in GB 2,328,207.

The above chiral compounds of formula VII and VIII exhibit a very high helical twisting power (HTP), and are therefore particularly useful for the purpose of the present invention.

A polymerizable CLC material according to the second preferred embodiment as described above comprises one or more chiral mesogenic compounds that should exhibit planar alignment themselves, in particular polymerizable chiral compounds of this type. Preferably these compounds are selected of formula I, wherein Sp and/or R are comprising a chiral moiety. Particularly preferred are chiral compounds selected of the formula Va to Vm above.

A polymerizable CLC material according to the fourth preferred embodiment as described above comprises a surface active component comprising one or more surfactants.

Suitable surfactants are described for example in J. Cognard, Mol.Cryst.Liq.Cryst. 78, Supplement 1, 1–77 (1981). Particularly preferred are non-ionic surfactants, such as mixtures of non-ionic fluoroalkylalkoxylate surfactants selected from the following formulae $C_nF_{2n+1}SO_2N(C_2H_5)(CH_2CH_2O)_xCH_3$     IX $C_nF_{2n-1}(CH_2CH_2O)_xH$     X wherein n is an integer from 4 to 12 and x is an integer from 5 to 15. Upon using these surfactants it is possible to produce polymerized films with a low tilt angle in the range from 0 to 1 degrees, in particular 0 to 0.5 degrees. In the best case the tilt angle is approximately 0 degrees.

The surfactants of formula IX are commercially available under the trade name Fluorad 171 (from 3M Co.), the surfactants of formula X under the trade name Zonyl FSN (from DuPont).

In case surfactants are used, the CLC material contains preferably from 500 to 2500 ppm, in particular from 1000 to 2500 ppm, very preferably from 1500 to 2500 ppm of surfactants. Further preferred materials contain 0.01 to 5%, in particular 0.1 to 3%, very preferably 0.2 to 2% by weight of surfactants.

A particularly preferred polymerizable CLC mixture according to the first preferred embodiment comprises
a) 5 to 80%, very preferably 10 to 65% by weight of up to five, preferably one, two or three monoreactive mesogenic compounds having a polar terminal group,
b) 10 to 90%, very preferably 25 to 75% by weight of up to four, preferably one or two, direactive polymerizable mesogenic compounds,
c) 0.1 to 15%, very preferably 0.2 to 8% by weight of up to three, preferably one or two, non-polymerizable chiral dopants,
d) 0.5 to 10%, very preferably 1 to 7% by weight of a polymerization initiator,
e) 0 to 5%, very preferably 0.1 to 2% by weight of one or more surfactants.

The compounds of component a) are preferably selected from the above formulae Va and Vb.

The compounds of component b) are preferably selected from the above formulae VIa and VIb.

The chiral dopants of component c) are preferably selected from the above formulae VII and VIII.

The surfactants of component e) are preferably selected from the above formulae IX and X.

According to the inventive method, the polymerizable CLC material is coated onto a substrate and aligned into a uniform orientation. It can then be subsequently polymerized to permanently fix the orientation of the cholesteric material.

As a substrate for example a glass or quarz sheet or a plastic film or sheet can be used. In case of polymerizable matetrials, the substrates can be removed after polymerization or not. In case the substrate is not removed from the polymerized film after polymerization, preferably an isotropic substrate is used.

Preferably the substrate is a plastic substrate such as for example a film of polyester such as polyethyleneterephthalate (PET), of polyvinylalcohol (PVA), polycarbonate (PC) or triacetylcellulose (TAC), especially preferably a PET film or a TAC film. As a birefringent substrate for example an uniaxially stretched plastic film can be used. For example PET films are commercially available from ICI Corp. under the trade name Melinex.

The CLC material can also be dissolved in a solvent, preferably in an organic solvent. The solution is then coated onto the substrate, for example by spin-coating or other known techniques, and the solvent is evaporated off. In most cases it is suitable to heat the mixture in order to facilitate the evaporation of the solvent.

In addition to the methods described above, planar alignment in the coated layer of the CLC material can further be enhanced by shearing the material, e.g. by means of a doctor blade. It is also possible to apply an alignment layer, for example a layer of rubbed polyimide or sputtered $SiO_x$, on top of the substrate, or alternatively to directly rub the substrate, i.e. without applying an additional alignment layer.

For example rubbing can be achieved by means of a rubbing cloth, such as a velvet cloth, or with a flat bar coated with a rubbing cloth. In a preferred embodiment of the present invention rubbing is achieved by means of a at least one rubbing roller, like e.g. a fast spinning roller that is brushing across the substrate, or by putting the substrate between at least two rollers, wherein in each case at least one of the rollers is optionally covered with a rubbing cloth. In another preferred embodiment of the present invention rubbing is achieved by wrapping the substrate at least partially at a defined angle around a roller that is preferably coated with a rubbing cloth.

Polymerization of the polymerizable CLC material takes place by exposing it to heat or actinic radiation. Actinic radiation means irradiation with light, like UV light, IR light or visible light, irradiation with X-rays or gamma rays or irradiation with high energy particles, such as ions or electrons. Preferably polymerization is carried out by UV irradiation.

As a source for actinic radiation for example a single UV lamp or a set of UV lamps can be used. When using a high lamp power the curing time can be reduced. Another possible source for actinic radiation is a laser, like e.g. a UV laser, an IR laser or a visible laser.

The polymerization is carried out in the presence of an initiator absorbing at the wavelength of the actinic radiation. For example, when polymerizing by means of UV light, a photoinitiator can be used that decomposes under UV irradiation to produce free radicals or ions that start the polymerization reaction.

When curing polymerizable mesogens with acrylate or methacrylate groups, preferably a radical photoinitiator is used, when curing polymerizable mesogens vinyl and epoxide groups, preferably a cationic photoinitiator is used.

It is also possible to use a polymerization initiator that decomposes when heated to produce free radicals or ions that start the polymerization.

As a photoinitiator for radical polymerization for example the commercially available Irgacure 651, Irgacure 184, Darocure 1173 or Darocure 4205 (all from Ciba Geigy AG) can be used, whereas in case of cationic photopolymerization the commercially available UVI 6974 (Union Carbide) can be used.

The polymerizable CLC mixture preferably comprises 0.01 to 10%, very preferably 0.05 to 5%, in particular 0.1 to 3% of a polymerization initiator. UV photoinitiators are preferred, in particular radicalic UV photoinitiators.

The curing time is dependening, inter alia, on the reactivity of the polymerizable mesogenic material, the thickness of the coated layer, the type of polymerization initiator and the power of the UV lamp. The curing time according to the invention is preferably not longer than 10 minutes, particularly preferably not longer than 5 minutes and very particularly preferably shorter than 2 minutes. For mass production short curing times of 3 minutes or less, very preferably of 1 minute or less, in particular of 30 seconds or less, are preferred.

In addition to polymerization initiators the polymerizable material may also comprise one or more other suitable components such as, for example, catalysts, stabilizers, chain-transfer agents, co-reacting monomers or surface-active compounds. In particular the addition of stabilizers is preferred in order to prevent undesired spontaneous polymerization of the polymerizable material for example during storage.

As stabilizers in principal all compounds can be used that are known to the skilled in the art for this purpose. These compounds are commercially available in a broad variety. Typical examples for stabilizers are 4-ethoxyphenol or butylated hydroxytoluene (BHT).

Other additives, like e.g. chain transfer agents, can also be added to the polymerizable material in order to modify the physical properties of the inventive polymer film. When adding a chain transfer agent, such as monofunctional thiol compounds like e.g. dodecane thiol or multifunctional thiol compounds like e.g. trimethylpropane tri(3-mercaptopropionate), to the polymerizable material, the length of the free polymer chains and/or the length of the polymer chains between two crosslinks in the inventive polymer film can be controlled. When the amount of the chain transfer agent is increased, the polymer chain length in the obtained polymer film is decreasing.

It is also possible, in order to increase crosslinking of the polymers, to add up to 20% of a non mesogenic compound with two or more polymerizable functional groups to the polymerizable material alternatively or in addition to the di- or multifunctional polymerizable mesogenic compounds to increase crosslinking of the polymer.

Typical examples for difunctional non mesogenic monomers are alkyldiacrylates or alkyldimethacrylates with alkyl groups of 1 to 20 C atoms. Typical examples for non mesogenic monomers with more than two polymerizable groups are trimethylpropanetrimethacrylate or pentaerythritoltetraacrylate.

In another preferred embodiment the polymerizable CLC mixture comprises up to 70%, preferably 3 to 50% of a non mesogenic compound with one polymerizable functional group. Typical examples for monofunctional non mesogenic monomers are alkylacrylates or alkylmethacrylates.

It is also possible to add, for example, a quantity of up to 20% by weight of a non polymerizable liquid-crystalline compound to adapt the optical properties of the optical retardation film.

In a preferred embodiment of the invention the polymerization of the polymerizable CLC mixture is carried out under an atmosphere of inert gas, preferably under a nitrogen atmosphere.

The selection of suitable polymerization temperatures depends mainly on the clearing point of the polymerizable material and inter alia on the softening point of the substrate. Preferably the polymerization temperature is at least 30 degrees below the clearing temperature of the polymerizable mesogenic mixture.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosure of all applications, patents and publications, cited above or below, and of corresponding European application No. 99112830.7, filed Jul. 2, 1999 is hereby incorporated by reference.

EXAMPLES

The following abbreviations are used to illustrate the liquid crystalline phase behavior of the compounds: K=crystalline; N=nematic; S=smectic; Ch=cholesteric; I=isotropic. The numbers between the symbols indicate the phase transition temperatures in °C.

Example 1

Polymerizable CLC mixture 1 with high twist and reflecting blue light and polymerizable CLC mixture 2 with low twist and reflecting red light were formulated

| Component | Mixture 1 (%) | Mixture 2 (%) |
|---|---|---|
| (1) | 43.8 | 43.8 |
| (2) | 16.0 | 19.5 |
| (3) | 25.5 | 25.2 |
| (4) | 10.0 | 10.0 |
| (5) | 3.2 | — |
| Irgacure 369 | 1.0 | 1.0 |
| FC 171 | 0.5 | 0.5 |
| central reflection wavelength | 430 nm | 795 nm |

(1) $CH_2=CHCO_2(CH_2)_3O\text{—}\langle\text{—}\rangle\text{—}COO\text{—}\langle\text{—}\rangle(CH_3)\text{—}OCO\text{—}\langle\text{—}\rangle\text{—}O(CH_2)_3O_2CCH=CH_2$ (2) $CH_2=CHCOO(CH_2)_6O\text{—}\langle\text{—}\rangle\text{—}COO\text{—}\langle\text{—}\rangle\text{—}CN$ (3) $CH_2=CHCO_2(CH_2)_6O\text{—}\langle\text{—}\rangle\text{—}COO\text{—}\langle\text{—}\rangle\text{—}CH_2\overset{*}{C}H(CH_3)C_2H_5$ (4) $CH_2=CHCO_2(CH_2)_6O\text{—}\langle\text{—}\rangle\text{—}COO\text{—}\langle\text{—}\rangle\text{—}\langle\text{—}\rangle\text{—}CH_2\overset{*}{C}H(CH_3)C_2H_5$ (5) $H_{13}C_6O\text{—}\langle\text{—}\rangle\text{—}COO\text{—}[\text{bicyclic dianhydro sugar}]\text{—}OCO\text{—}\langle\text{—}\rangle\text{—}OC_6H_{13}$ Compounds (1) and (2) can be prepared according to or in analogy to the methods described in D. J. Broer et al., Makromol.Chem. 190, 3201–3215 (1989). The preparation of compounds (3) and (4) is described in DE 195,04,224. The preparation of the chiral dopant (5) is described in WO 98/00428. Irgacure 369 is a commercially available photo-initiator (from Ciba Geigy). FC 171 is a commercially available non-ionic fluorocarbon surfactant (from 3M Corp.).

Each mixture was dissolved in xylene to give a 50% solution.

Blue mixture 1 was spin-coated onto a glass substrate with a rubbed polyimide alignment layer at a spin speed of 3000 rpm. The cholesteric layer was annealed at 60° C. for 30 seconds, and then polymerized by exposure to UV radiation (wavelength 360 nm, intensity 13 mW/cm²) for 1 minute under a nitrogen atmosphere, to give the one-layer polymer film 1A.

The process was repeated for red mixture 2 to give the one-layer polymer film 1C.

Furthermore, the xylene solution of red mixture 2 was coated and polymerized as described above on top of the polymerized layer of blue mixture 1 to give the two-layer polymer film 1B.

The process was repeated, but now by coating and polymerizing blue mixture 1 on top of the polymerized layer of red mixture 2, to give the two-layer polymer film 1D.

The visible light absorption spectrum of each of films 1A–1D was measured (Hitachi U2000 spectrophotometer) using circularly polarized light, the reflection from the cholesteric layer appearing as an absorption peak in the spectrum. The spectra are shown in FIG. 1 (curve A–D). Table 1 shows the wavelength of the center of the reflection peak for films 1A–1D ($\lambda$), the difference of $\lambda$ between the peaks of two-layer films and their corresponding one-layer films ($\Delta\lambda$), and the relative change of $\lambda$ ($|\Delta\lambda/\lambda|$).

TABLE 1

Central reflection wavelengths for one- and two-layer cholesteric films of example 1

| No. | Layer sequence | $\lambda$(nm) Peak 1 | $\lambda$(nm) Peak 2 | $\Delta\lambda$(nm) Peak 1 | $\Delta\lambda$(nm) Peak 2 | $|\Delta\lambda/\lambda|$* Peak 1 | $|\Delta\lambda/\lambda|$* Peak 2 |
|---|---|---|---|---|---|---|---|
| 1A | mixture 1 | 420 | — | | | | |
| 1B | mix. 1 coated first, then mix. 2 | 446 | 714 | +26 | −65 | 0.06 | 0.08 |
| 1C | mixture 2 | — | 779 | | | | |
| 1D | mix. 2 coated first, then mix. 1 | 421 | 815 | +1 | +36 | 0.002 | 0.05 |

*$\lambda$ refers to film 1A and 1C, respectively

Film 1A of blue mixture 1, comprising the chiral compounds (3) and (4) and additionally comprising the high HTP dopant (5), shows a short pitch (i.e. high twist) with selective reflection of blue light. Film 1C of red mixture 2 without the additional dopant (5) shows a long pitch (i.e. low twist) with selective reflection of red light. The two-layer films 1B and 1D show two reflection peaks, each corresponding to one of the polymerized layers of mixture 1 and 2.

The shift $\Delta\lambda$ of the reflection wavelength of the two peaks in the two-layer films 1B and 1D compared to the corresponding peak in the single-layer films 1A and 1C is shown in Table 1, together with the relative change of the reflection wavelength $|\Delta\lambda/\lambda|$. It can be seen that, in case of film 1B, where blue mixture 1 was coated first, there is a significant shift $\Delta\lambda$ of the longer wavelength peak (Peak 2) to shorter wavelengths, compared to the same peak in one-layer film 1C. This can be explained by the non-polymerizable chiral dopant (5) migrating from the first, polymerized layer of mixture 1 into the second, non-polymerized layer of mixture 2 during the annealing of the second layer. The resulting increase in concentration of chiral material in the second layer shifts its reflection peak to shorter wavelengths.

On the other hand, the shorter wavelength peak (Peak 1) in film 1B is only shifted to a small amount towards longer wavelengths, compared to the same peak in one-layer film 1A. The shift of Peak 1 is much smaller than observed for Peak 2, because in the first layer (mixture 1) with the short wavelength peak (Peak 1) the cholesteric structure is already fixed by crosslinking. Here, the shift of peak 1 is mainly due to swelling of the first layer by the unpolymerized material of the second layer, which increases the layer thichkess and thus increases the pitch, whereas the loss of chiral dopant (5) migrating out of the first layer layer does not have a significant influence on its helical pitch and reflection wavelength.

In case of film 1D, where mixture 2 was coated first, the shift of both the peaks with longer wavelength (Peak 2) and shorter wavelength (Peak 1) is much smaller compared to film 1B. This is because now the first layer (mixture 2) does not contain any non-polymerizable chiral material (compound (5)) that can migrate into the second layer.

Example 2

Polymerizable CLC mixture 3 with high twist and reflecting blue light and polymerizable CLC mixture 4 with low twist and reflecting red light were formulated

| Component | Mixture 3 (%) | Mixture 4 (%) |
| --- | --- | --- |
| (1) | 50.0 | 50.0 |
| (2) | 9.0 | 9.0 |
| (6) | 23.0 | 25.0 |
| (7) | 12.5 | 12.5 |
| (8) | 4.5 | 2.5 |
| Irgacure 651 | 1.0 | 1.0 |
| central reflection wavelength | 446 nm | 827 nm |

(6) $CH_2=CHCOO(CH_2)_6O-\langle\text{ring}\rangle-COO-\langle\text{ring}\rangle-OCH_3$ (7) $CH_2=CHCO_2(CH_2)_6O-\langle\text{ring}\rangle-COO-\langle\text{ring with }CH_3\rangle-OCO-\langle\text{ring}\rangle-O(CH_2)_6O_2CCH=CH_2$ (8) $H_3CO-\langle\text{ring}\rangle-CO_2-\langle\text{ring}\rangle-CO_2-\langle\text{isosorbide}\rangle-O_2C-\langle\text{ring}\rangle-O_2C-\langle\text{ring}\rangle-OCH_3$ Compounds (6) and (7) can be prepared according to or in analogy to the methods described in D. J. Broer et al., Makromol.Chem. 190, 3201–3215 (1989). The preparation of the chiral dopant (8) is described in WO 98/00428. Irgacure 651 is a commercially available photoinitiator (from Ciba Geigy).

Each mixture was dissolved in xylene to give a 50% solution.

Blue mixture 3 was spin-coated onto a glass substrate with a rubbed polyimide alignment layer at a spin speed of 3000 rpm. The cholesteric layer was annealed at 84° C. for 30 seconds, and then polymerized by exposure to UV radiation (wavelength 360 nm, intensity 13 mW/cm$^2$) for 1 minute under a nitrogen atmosphere, to give the one-layer polymer film 2A.

The process was repeated for red mixture 4 to give the one-layer polymer film 2B.

Furthermore, the xylene solution of red mixture 4 was spin-coated as described above onto the polymerized layer of blue mixture 3. The unpolymerized layer of mixture 4 was then annealed at a temperature of 84° C. for various periods of time, and subsequently polymerized as described above, to give the two-layer films 2C–2G.

The visible light absorption spectrum of each of films 2A–2G was measured (Hitachi U2000 spectrophotometer) using circularly polarized light, the reflection from the cholesteric layer appearing as an absorption peak in the spectrum. The spectra for films 2B–2G are shown in FIG. 2 (curve B–G). Table 2 shows the wavelength of the center of the reflection peak for films 2A–2G ($\lambda$), the difference of $\lambda$ between the peaks of two-layer films 2C–2G and their corresponding one-layer films ($\Delta\lambda$), and the relative change of $\lambda$ ($|\Delta\lambda/\lambda|$).

TABLE 2

Central reflection wavelengths for one- and two-layer cholesteric films of example 2

| No. | Annealing time (min) for 2$^{nd}$ layer | $\lambda$ (nm) Layer 1 | $\lambda$ (nm) Layer 2 | $\Delta\lambda$ (nm) Layer 1 | $\Delta\lambda$ (nm) Layer 2 | $|\Delta\lambda/\lambda|$** Layer 2 |
|---|---|---|---|---|---|---|
| 2A | 0* | — | 780* | — | — | |
| 2B | 0* | 433* | — | — | — | |
| 2C | 5 | 440 | 700 | +7 | −80 | 0.11 |
| 2D | 10 | 442 | 640 | +9 | −140 | 0.20 |
| 2E | 20 | 440 | 592 | +7 | −188 | 0.27 |
| 2F | 30 | 442 | 552 | +9 | −228 | 0.33 |
| 2G | 50 | 448 | 518 | +15 | −262 | 0.37 |

*values taken for one-layer films of each mixture
**$\lambda$ refers to film 2A and 2B, respectively It can be seen from FIG. 2 and Table 2 that with increasing annealing time $\lambda$ of the second layer moves to progressively shorter wavelengths. At the same time $\lambda$ of the first layer remains substantially unaffected.

The decrease of $\lambda$ in the second can be explained by diffusion of the non-polymerizable choral dopant (8) from the first layer into the second layer. On the other hand, $\lambda$ of the first layer does not change remarkably due to its high degree of crosslinking, therefore the loss of chiral dopant (8) migrating out of this layer does not have a significant influence on its helical pitch and reflection wavelength.

Example 3

Several samples of a one-layer polymer film of polymerizable blue CLC mixture 3 of example 2 were prepared as described in example 2. Each sample was treated with a different solvent to remove unpolymerized material from the film. This resulted in a change of the reflection wavelength of the films as shown in table 3.

TABLE 3

Central reflection wavelength for one-layer cholesteric film of example 3 before and after solvent treatment

| No. | Solvent | $\lambda$ before | $\lambda$ after | $\Delta\lambda$ | $|\Delta\lambda/\lambda|$ |
|---|---|---|---|---|---|
| a | Diethyl ether | 433 | 434 | −1 | 0.002 |
| b | Propan-2-ol | 432 | 432 | 0 | 0 |
| c | Cyclohexane | 435 | 434 | 1 | 0.002 |
| d | PGMEA | 434 | 439 | −5 | 0.01 |
| e | Butanone | 431 | 386 | 45 | 0.10 |
| f | Ethyl acetate | 435 | 385 | 50 | 0.11 |
| g | Tetrahydrofuran | 430 | 380 | 50 | 0.12 |
| h | Acetone | 431 | 374 | 57 | 0.13 |
| i | Toluene | 433 | 364 | 69 | 0.16 |

From table 3 it can be seen that treatment with solvents a–d results only in a negligible change of the reflection wavelength $\lambda$, whereas treatment with solvents e–i leads to a significant change of $\lambda$. Thus, solvents e–i have a larger penetrating effect on the polymer film than solvents a–d.

Figure 1:
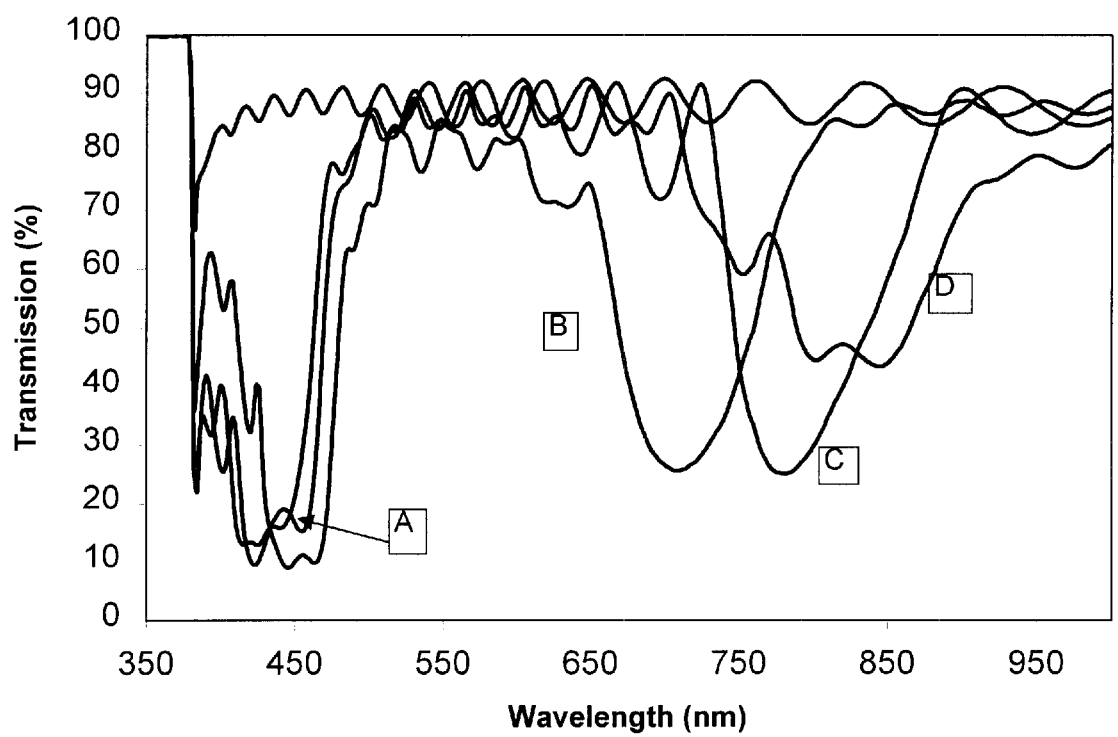
FIG. 1 shows the visible light absorption spectrum for flims 1A–1D of Example 1.
Figure 2:
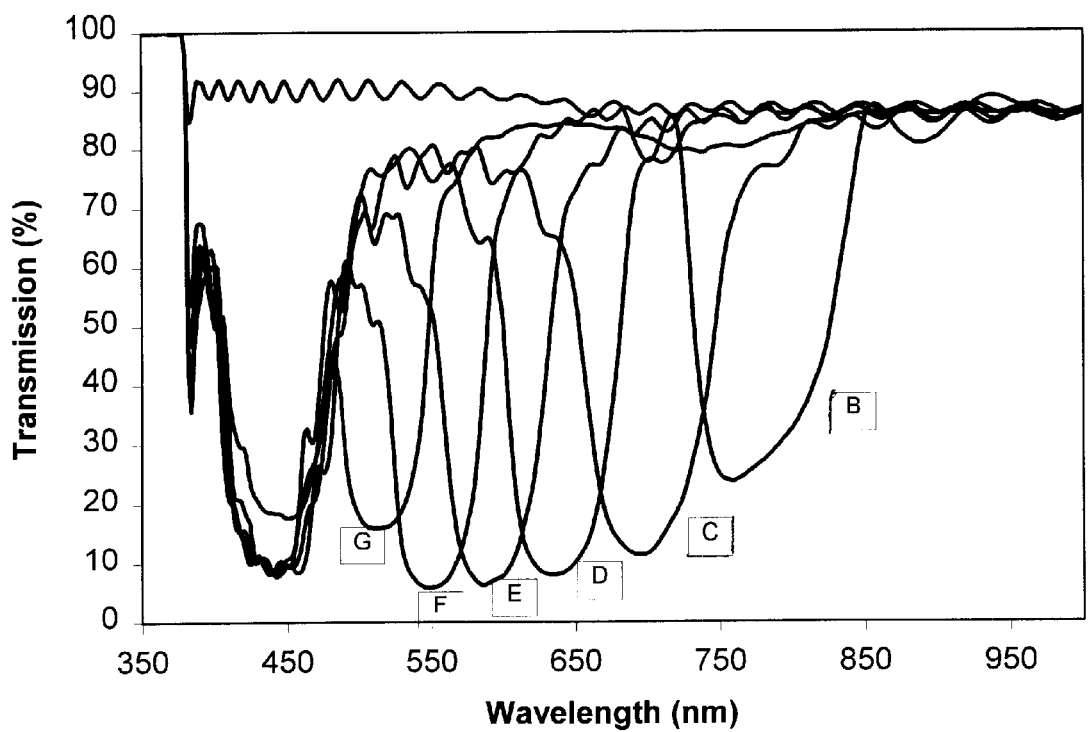
FIG. 2 shows the visible light absorption spectrum for flims 2A–2G of Example 2.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A process for preparing a multilayer cholesteric film comprising two or more layers of polymerized cholesteric liquid crystal (CLC) material with planar orientation, comprising:

preparing the first layer by applying a layer of polymerizable CLC material on a substrate, optionally aligning the CLC material in a planar orientation, and polymerizing the aligned CLC material, and preparing the second and higher layers as described above on one of the previously polymerized layers as a substrate, wherein migration of unpolymerized material between adjacent layers is minimized.

2. A process according to claim 1, wherein the migration of unpolymerized material is minimized such that the shift of the reflection wavelength $|\lambda-\lambda_0|/\lambda_0$ in said second and higher layers is $\leq 0.1$, wherein $\lambda_0$ is the wavelength of the center of the reflection peak of the CLC material of said second layer when polymerized as a single layer on a substrate, and $\lambda$ is the wavelength of the center of the reflection peak of the CLC material of said second layer when polymerized on said first layer.

3. A process according to claim 2, wherein adjacent layers are prepared in an order where the pitch of the CLC material of the layer that is prepared first is longer than the pitch of the CLC material of the layer that is prepared next.

4. A process according to claim 1, wherein at least two adjacent layers in the multilayer cholesteric film have different helical pitch.

5. A process according to claim 1, wherein the polymerized material in each of said first, second and higher layers forms a three-dimensional network.

6. A process according to claim 1, wherein the amount of unpolymerized compounds in the first layer is minimized.

7. A process according to claim 6, wherein the CLC material of the first and higher layers comprises less than 15% by weight of one or more non-polymerizable chiral dopants.

8. A process according to claim 1, wherein the CLC material of the second and higher layers comprises one or more chiral dopants with a helical twisting power (HTP)>20 $\mu m^{-1}$.

9. A process according to claim 1, wherein the extent of polymerization of the first layer is maximized.

10. A process according to claim 1, wherein the polymerizable CLC material of at least one of the second and higher layers is used in combination with a solvent which is selected to have a small penetrating effect on the previously polymerized layer.

11. A process according to claim 1, wherein the polymerizable CLC material of at least one of the second and higher layers is annealed at a temperature below the cholesteric-isotropic phase transition temperature of the CLC material prior to polymerization, wherein the annealing time and temperature are minimized.

12. A process according to claim 11, wherein the annealing temperature is 1 to 40° C. below the cholesteric-isotropic phase transition temperature of the polymerizable CLC material.

13. A process according to claim 11, wherein the annealing time is less than 1 minute.

14. A multilayer cholesteric film prepared by the process according to claim 1.

15. An optical element, a cosmetic or a liquid crystal pigment, which comprises a multilayer cholesteric film according to claim 14.

16. A polarizer, compensator, alignment layer, color filter or holographic element, comprising a multilayer cholesteric film according to claim 14.

17. A process of preparing a multilayer cholesteric film comprising two or more layers of polymerized cholesteric liquid crystal (CLC) material with planar orientation, comprising successive polymerization of at least one layer upon a previous layer, wherein migration of unpolymerized material between adjacent layers is minimized.

* * * * *